US011652837B2

(12) United States Patent
Borah

(10) Patent No.: US 11,652,837 B2
(45) Date of Patent: May 16, 2023

(54) DIGITAL ACCESS CONTROL USING TIME-BASED BASELINE ACCESS DISTRIBUTIONS

(71) Applicant: Okta, Inc., San Francisco, CA (US)

(72) Inventor: Gautam Borah, San Ramon, CA (US)

(73) Assignee: Okta, Inc., San Francisco, CA (US)

( * ) Notice: Subject to any disclaimer, the term of this patent is extended or adjusted under 35 U.S.C. 154(b) by 205 days.

(21) Appl. No.: 17/163,111

(22) Filed: Jan. 29, 2021

(65) Prior Publication Data

US 2022/0247767 A1    Aug. 4, 2022

(51) Int. Cl.
*H04L 9/40* (2022.01)

(52) U.S. Cl.
CPC .......... *H04L 63/1425* (2013.01); *H04L 63/08* (2013.01)

(58) Field of Classification Search
CPC .... H04W 2/63; H04W 12/61; H04L 63/1425; H04L 63/0815; H04L 63/08; H04L 63/107; H04L 2463/082
See application file for complete search history.

(56) References Cited

U.S. PATENT DOCUMENTS

| 9,721,086 | B2* | 8/2017 | Shear | G06F 21/6218 |
| 10,122,757 | B1* | 11/2018 | Kruse | H04L 63/10 |
| 10,353,981 | B2* | 7/2019 | Greene | H04L 67/01 |

* cited by examiner

*Primary Examiner* — Benjamin A Kaplan
(74) *Attorney, Agent, or Firm* — Holland & Hart LLP

(57) ABSTRACT

An access analysis system obtains data about user requests to access particular applications, such as identifiers of the particular user and application involved, the time of the request, and (optionally) additional contextual data, and uses that data to generate user access distributions that quantify the distribution of a given user's requests to access applications over time. After one or more distributions have been generated for a particular user, when that user submits a new access request for an application, the access analysis system can compare the request to the previously-generated access distributions to determine whether (or to what degree) the request is anomalous. If the request is sufficiently non-anomalous, it can be granted with little or no additional actions required by the user or the user's device; if, however, the request is sufficiently anomalous, it can be denied, or additional information—such as additional user authentication factors—can be required.

8 Claims, 6 Drawing Sheets

DIGITAL ACCESS CONTROL USING TIME-BASED BASELINE ACCESS DISTRIBUTIONS

FIELD OF ART

The present invention generally relates to the field of software systems, and more specifically, to the creation and use of models of user access to applications or other types of digital resources over time.

BACKGROUND

Digital computer systems typically require their users to provide credentials, such as username/password, PINs generated by hardware tokens, biometrics, or the like in order to gain access to those systems. Most modern computer systems are accessible not only from a single secure physical location (such as the user's own home), but rather are accessible over a computer network via a variety of different possible devices at a variety of different possible locations. Unfortunately, the high degree of accessibility of modern systems also makes it easier for unauthorized persons to gain access by logging in from a remote location, e.g., through a brute-force password attack.

SUMMARY

An access analysis system obtains data about user requests to access particular applications, such as identifiers of the particular user and application involved, the time of the request, and (optionally) additional contextual data, and uses that data to generate user access distributions that quantify the distribution of a given user's requests to access applications over time. After one or more distributions have been generated for a particular user, when that user submits a new access request for an application, the access analysis system can evaluate the request by comparing it to the previously-generated access distributions to determine whether (or to what degree) the request is anomalous. If the request is sufficiently non-anomalous, it can be granted with little or no additional actions required by the user or the user's device; if, however, the request is sufficiently anomalous, it can be denied, or additional information—such as additional user authentication factors—can be required.

The access distribution(s) for a user may include a plurality of distributions generated according to different time scales, such as hours in a day, days in a month, days in a year, or the like. Since each different time scale is capable of capturing different information about accesses (e.g., seasonality, work habits, etc.), the use of multiple time scales permits richer, more detailed analysis of user accesses.

The access distributions may additionally or alternatively be applied for purposes other than access anomaly detection, such as ranking applications for a user based on the current context (e.g., the current time, current device being used, or the like) in order to provide the user with a more intuitive and efficient user interface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1A:
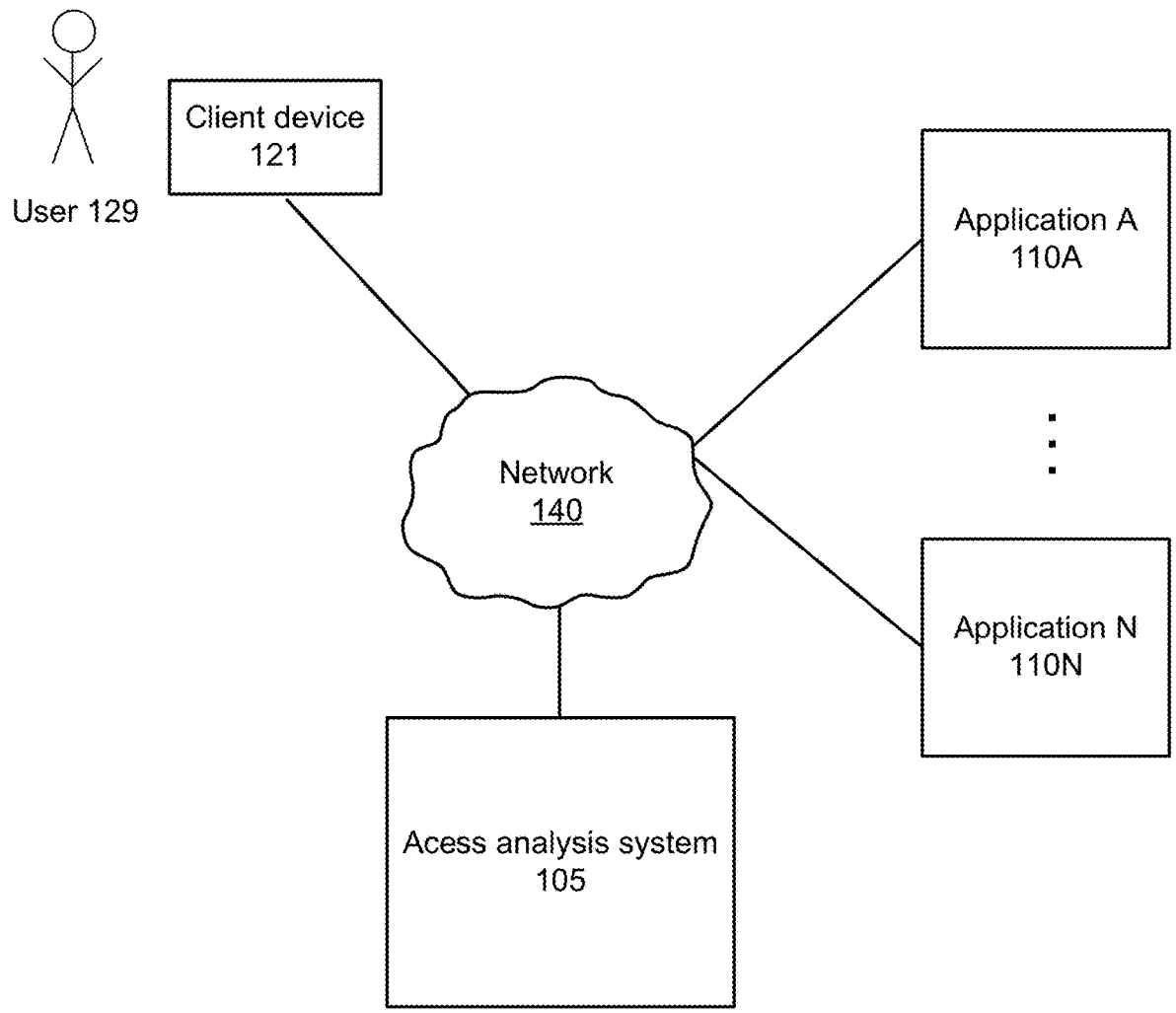
FIG. 1A illustrates one embodiment of a computing environment in which users use their client computing devices to access different applications over a computer network.

FIG. 1A illustrates one embodiment of a computing environment in which users use their client computing devices to access different applications over a computer network. Specifically, as illustrated in FIG. 1A, a user 129 uses his or her client device 121 to access one or more of a set of possible applications 110 via a computer network 140. An access analysis system 105 obtains information about the accesses, learns from the obtained information, and later applies its learning, such as to determine whether a particular application access allegedly by the user 129 appears to be anomalous (e.g., indicating a possible unauthorized access attempt by a malicious user).

The applications 110 need not be related to each other, but rather may be created and/or hosted by different organizations. The applications 110 may be partly or entirely accessible via a server separate from and independent of an organization with which the user 129 is affiliated and/or the access analysis system 105. For example, the applications may be remote web-based applications accessible via a web server, applications implemented partially as local apps on the user's client device 121 and partially as server-based functionality that functions on a remote application server and with which the apps communicate, or the like. Some examples of possible applications 110 include GMAIL, SALESFORCE, MICROSOFT OFFICE 365, or the like.

The user 129 may use any client device 121 capable of accessing applications over networks. For example, the client device 121 could be a desktop computer, laptop computer, smartphone, set top box, or the like.

Figure 1B:
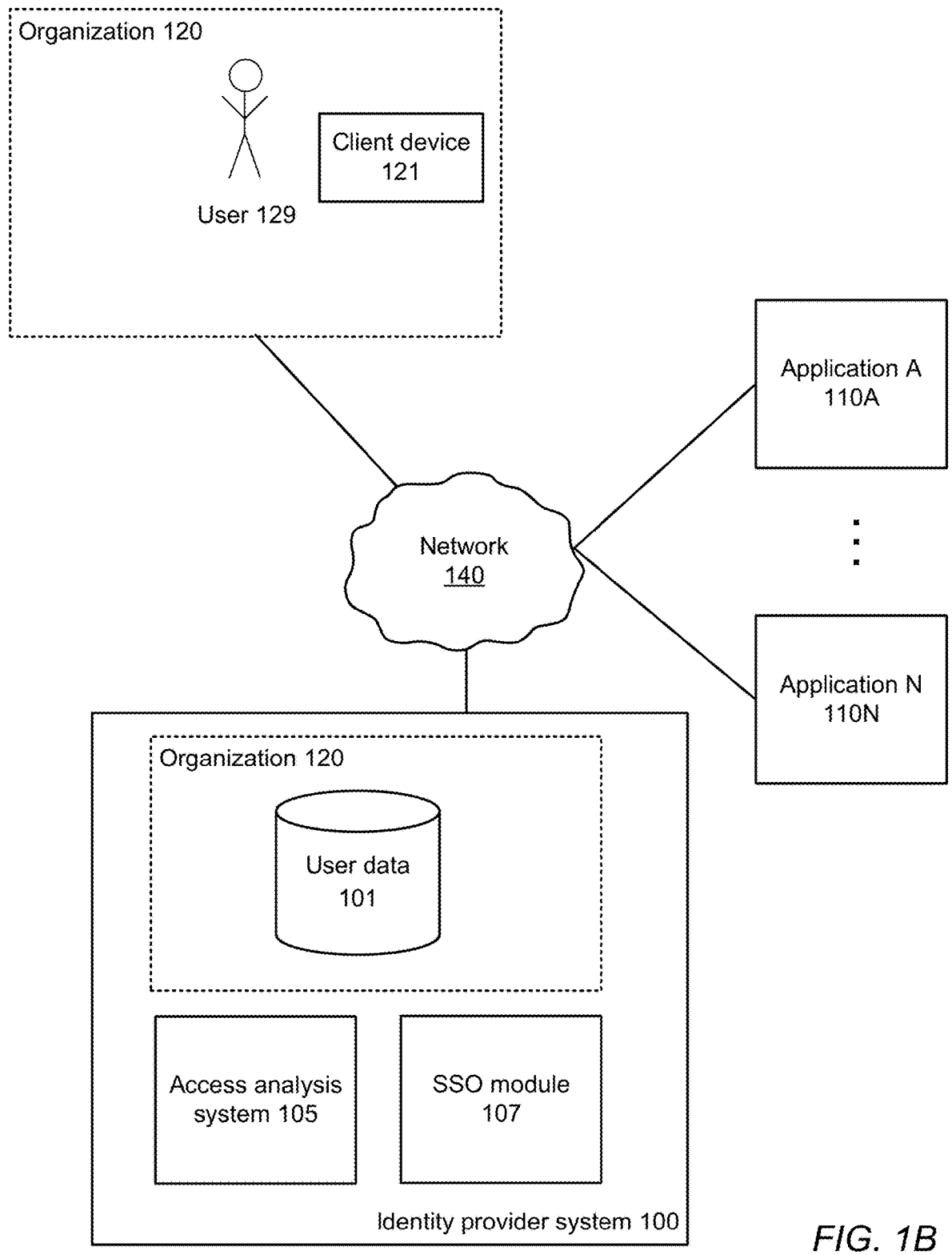
FIG. 1B illustrates one specific embodiment of the computer environment of FIG. 1A, in which the access analysis system of FIG. 1 is a part of an identity provider system.

FIG. 1B illustrates one specific embodiment of the computer environment of FIG. 1A, in which the access analysis system 105 is a part of an identity provider system 100. The identity provider system 100 provides identity services to different organizations 120 (e.g., businesses, charities, governmental entities, or the like) with whom it has an established relationship. The organizations 120 each have various members (e.g., the user 129) such as employees or volunteers, and the members may accomplish tasks on behalf of the organization using their client devices 121. The users may have multiple accounts on different systems, and the systems may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.) like the applications 110 depicted in FIGS. 1A and 1B, databases, files systems, or the like. Since each application 110 or other resource could be from a different provider—each of which could have a different identity for a user—a single user will typically have many different identities and associated credentials corresponding to the different resources that the user uses. An identity provider (IdP) system provides users with a federated identity integrating the users' different identities on different accounts, thereby providing more convenient, efficient, and secure access to the different accounts. These entities are now described in more detail.

The identity provider system (IdP system) 100 provides the user 129 with a federated identity linking the various identities of the user on the different accounts (e.g., the applications 110) or other resources to which the user has access. The IdP system 100 stores user data 101 that include a set of identities of known users with accounts on the IdP system 100. The user data 101 may include a form of identity on the IdP system 100 such as a username, as well as other credential data associated with a user, such as a user password or information derived therefrom. The user data 101 may also include many other types of data about users, such as the factor types and providers that they may use when seeking identity verification from the IdP system 100, their role(s) or group(s) within the organization 120 to which they belong (e.g., "Engineering", "Legal", "Manager 2", "Director", or the like), and/or the resources to which they have access (e.g., third-party applications 110), as some examples. The user data 101 may also include identities and credentials of the various users on the various accounts to which they have access, thereby linking a user's identity on the IdP system 100 to the user's identities on those different accounts and (by extension) permitting access to those accounts. In some embodiments, the IdP system 100 is part of the organization 120, rather than being an independent entity as it is in other embodiments.

Software on the client device 121 facilitates providing users with federated identities by securely and transparently communicating with the IdP system 100 that handles the details of identity federation and provides related identity services. In this way, the users of the organization 120 simply and securely obtain access to the various third-party accounts or other resources that they need to complete tasks on behalf of the organization. The software on the client device 121 that communicates with the IdP system may (although need not) be provided by the entity responsible for the IdP system 100.

In some embodiments, the IdP system 100 includes a single sign-on (SSO) module 107 that allows the IdP system to transparently log a user in to the different accounts or other resources to which the user has access. For example, for a given user who has logged in to the IdP system 100, the SSO module 107 can look up the user's accounts or other resources within the user data 101, as well as the user's credentials for those accounts. Using the credentials, as well as metadata or other information about the accounts, the SSO module 107 can automatically log the user into the applications 100 or other resources described in the user data 101, such as by establishing application sessions with the various applications and providing corresponding session data (e.g., session tokens) to the device 121. Thus, with a single login to the IdP system 100, the SSO functionality of the IdP system provides a user with automatic access to all the user's accounts or other resources.

Physically, the organization 120 is made up of a number of computing systems, including the various client devices 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
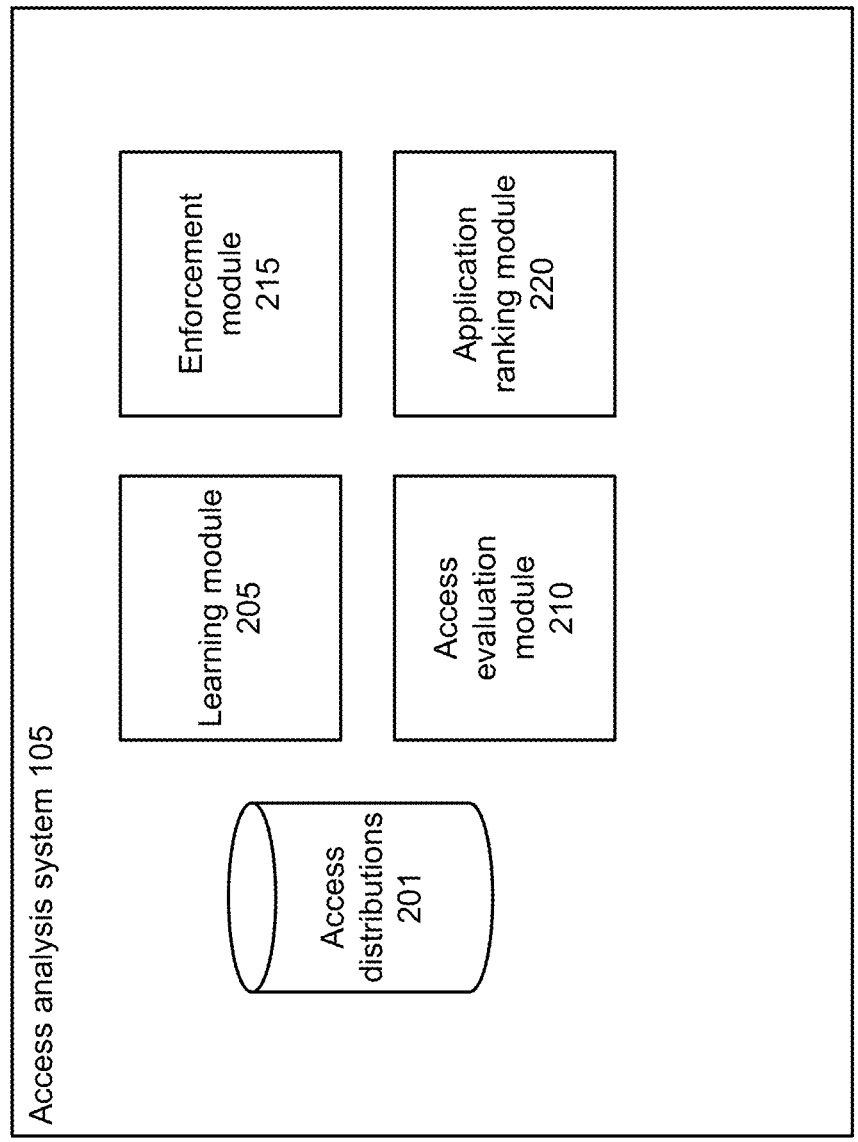
FIG. 2 illustrates components of the access analysis system of FIGS. 1A and 1B, according to some embodiments.

FIG. 2 illustrates components of the access analysis system 105 of FIGS. 1A and 1B, according to some embodiments. The access analysis system 105 includes a learning module 205 that (given prior application access data) generates access distributions 201 and other data that an access evaluation module 210 can use to determine whether new requests to access applications are anomalous. In some embodiments, the access analysis system also includes an enforcement module 215 to take actions based on the determinations of the access evaluation module 210, and/or an application ranking module 220 that ranks applications for potential use by a user based on the access distributions 201. These components are now discussed below in greater detail.

The learning module 205 receives application access data describing the accesses of particular users to particular applications at particular times, as well as any additional contextual data associated with the accesses. Thus, the application access data corresponding to one application access by a given user at a given time can be conceptualized as a tuple <time, user ID, application ID, additional contextual data>. The time element is time information describing a particular moment in time, from which may be derived additional data such as the minute of the day, or hour of the week, for example. The user ID is an identifier for the particular user accessing the application, the user ID being maintained by the access analysis system 105 and being unique relative to the user IDs of other users tracked by the access analysis system. Similarly, the application ID is an identifier for the particular application being accessed, and which is unique with respect to the application IDs of all other applications tracked by the access analysis system 105.

The additional contextual data includes any additional data that embodiments of the invention track for a given application access. For example, in various embodiments the additional contextual data includes an identifier of a portion of the application being accessed. For instance, the application being accessed could be described by a uniform resource locator (URL), and the portion of the application being accessed as a sub-portion of the URL. E.g., in the hypothetical URL https://customer1.payment.oag.com/paystub, the application might be represented by the domain name "customer1.payment.oag.com", and the portion of the application by the URL path "paystub". Thus, the access analysis system 105 can analyze accesses to different portions of the application in a different manner, e.g., allowing accesses to less sensitive functionality of an application with no further user data required, but requiring additional authentication data for more sensitive functionality of the application. In some embodiments, the additional contextual data includes data describing the particular client device 121 from which the application access is being requested, such as its device ID, its operating system type (e.g., OS name and/or version), its MAC ID, its browser type (e.g., product name and/or version number), or the like. The additional contextual data may also include information about the physical or virtual location of the device, such as geolocation data (e.g., GPS data) corresponding to the device, or an IP or other network address of the device. Additional types of contextual data may be employed in other embodiments.

The application access data can be obtained (e.g., by the access analysis system 105) through the standard metadata provided by client browsers, such as the User-Agent request header.

The learning module 205 processes the application access data—either in real time, or in batch mode based on application access data previously logged, or a combination of both, depending on the embodiment—and derives one or more access distributions 201. The access distributions 201 quantify application accesses according to some associated time series seasonality. For example, for the 24 hours in a day, the accessibility distribution is divided into 24 one-hour time buckets to measure daily seasonality for accessibility. Similarity, to calculate seasonality by merging data for the last 90 days, there would be 90 sets of 24 accessibility count buckets, each bucket having an access distribution count a corresponding hour of a corresponding day. The technique disclosed herein merges the first hour of the data from all the 90 collected data buckets (one for each of the 90 days) to calculate the daily seasonality of the first hour of the day. Similarly, the second hour of the accessibility count will be merged for all the 90 collected data buckets for the second hour (one for each of the 90 days) to calculate the seasonality of the second hour of the day. Similarly, the accessibility count for each hour can be merged to calculate the daily seasonality for each hour of the day.

The accessibility buckets can be merged with each other using different techniques in different embodiments. In some embodiments, the exponentially weighted moving average (EWMA) is used for the merging. The EWWA uses mean, variance and standard deviation to weight recent data points while evaluating the significance by assigning heavier weighting to more current data points, since they are more relevant than data points in the distant past. The time range of one hour in the examples above could be changed to any time range appropriate for evaluation. For example, daily seasonality for each minute of the day could be calculated by computing accessibility counts in minute-level buckets (i.e., using 1440 buckets, one for each of the 24*60=1440 minutes in a day). Daily seasonality is useful for evaluating application accesses for applications that that are used every day (including weekends), in a certain time pattern depending on the time (e.g., minute or hour) of the day.

Applications that are accessed that follow a weekly pattern—e.g., that are accessed only during weekdays, or only during weekends—will be evaluated by calculating weekly seasonality of accessibility distribution by hour or minute. In a week, there are 7*24=168 hours, and hence 168 count buckets will be used for measuring an accessibility distribution for each hour of the week. As another example, to calculate weekly seasonality for the latest 14 weeks, there will be we will have 14 sets of 168-count buckets for each week. The same technique described above is used to merge the first hour of each of the count bucket sets to calculate the weekly seasonality of the first hour of the week, and similarly, the 168th buckets from each of the 14-count bucket sets will be merged to calculate the last hour of the weekly seasonality. The accessibility buckets can be merged with each other using EWMA, among various possible merging techniques.

Applications that are accessed that follow a monthly pattern—e.g., that are accessed only during the beginning of the month or during the end of the month—will be evaluated by calculating monthly seasonality of accessibility distribution by hour or minute. In a 30-day month, there are 720 hours, and thus 720-count buckets for measuring accessibility distribution for each hour of the (30-day) month. If we decide to calculate monthly seasonality for the last 12 months (assuming, for simplicity of example, that all months have 30 days), there will be 12 sets of 720-count buckets for each month. The same technique described above can be used to merge the first hour of each of the count bucket sets to calculate the monthly seasonality of the first hour of the month; similarly, the 720th buckets from each of the 12-count bucket sets can be merged to calculate the last hour of the monthly seasonality. It is appreciated that many different timescales, with different numbers and granularities of time for their element buckets, can be employed, in addition to those described above.

In some embodiments, different access distributions (with the same timescale) are created for different subsets of attribute values of the application access data tuple. For example, the learning module 205 could create an access distribution for each user, for each attribute taken singly (e.g., for each application used by the user), and/or for different permutations of attribute values for the additional contextual data variables. For instance, in one embodiment the tuple <user $U_1$, application $A_4$, IP address $I_6$> might have one access distribution, and the tuple <user $U_1$, application $A_4$, IP address $I_7$> might have a different, completely separate access distribution, indicating that the same user can be expected to behave differently when accessing the same application from different network addresses. (E.g., a user might typically access an engineering application predominantly during morning hours, such as when at work, and a timekeeping application predominantly during evening hours, such as after having returned home.)

In some embodiments, different access distributions with different timescales are employed. For example, both an access distribution for an hours-in-a-day timescale and an access distribution for-a hours-in-a-month timescale could be generated, including for the same tuple of attribute values. Thus, for instance, the tuple <user $U_1$, application $A_4$, IP address $I_6$> might have an access distribution for both an hours-in-a-day timescale and a days-in-a-year timescale. Any number of different timescales may be employed in different embodiments. The use of different timescales allows the capture of different types of information, such as both daily and seasonal behavior.

Element buckets are established for an access distribution according to the desired number and granularity (e.g., 24 consecutive one-hour buckets for an hour-in-a-day access distribution, starting at midnight), and values are assigned to element buckets according to the access times of the various application access data. In some embodiments, a particular access is accounted for in the element bucket into which it falls (e.g., a 9:55 AM access falling into the "9 AM to 10 AM" element bucket). In some embodiments, in order to use more representative element buckets, a more granular set of buckets is selected for initial bucketing, and bucketing is evaluated in a sliding window around the (ultimately-desired) divisions between the coarser buckets, and then merging from the more granular counts to the coarser counts. For example, if hourly bucketing is ultimately desired, a more granular bucketing by individual minutes is initially employed, and a sliding window of 30 minutes before and 30 minutes after the divisions between hours is used to build an hourly trend, and then the minute-granularity distribution is merged to obtain the hour-granularity distribution.

The following discussion illustrates the difference between the use of a coarse-grained distribution and a finer-grained distribution. In one specific coarse-grained baseline calculation for daily seasonality, the day is divided into 24 buckets, each keeping a count of how many times an application is accessed by a user per clock hour of the day. The buckets are created based on clock hour boundaries for simplicity; e.g., an access between 12:00 AM to 01:00 AM will be reflected in the first bucket, and an access between 01:00 AM to 02:00 AM will be stored in the second bucket. If calculating a baseline for 90 days, there would be 90 sets of 24 buckets for each day. If the same user tries to access the application at 01:01 AM, the system will evaluate the second bucket from the 90 sets, and each bucket count from the second bucket will be merged to calculate the baseline, and if the user had accessed the application in the past during 01:00 AM to 02:00 AM clock hour, the system might determine that the new access request is not anomalous, given that other accesses had occurred before at that same time.

If a user accessed an application daily between 01:01 AM to 01:20 AM and then again between 02:40 AM to 02:59 AM, the above coarse-grained distribution calculation will mark the second and third buckets (corresponding to the second and third hours of the day) as non-anomalous user access trends. If an access request comes to the system at (for example) 01:55 AM or at 02:02 AM, both requests will be determined by the system to be non-anomalous requests because the second and third buckets already show past usage that that user in those time buckets.

If the intention of the system is to detect these two access requests as anomalous access requests, then coarse grained distribution evaluation will fail. However, a fine-grained rolling baseline calculation will be able to detect such requests as anomalous.

In a rolling distribution evaluation, the system would further divide the clock hour, e.g., into 60 buckets for each minute of the hour. This would constitute 24*60=144 buckets per day. The first 60 buckets will be for 12:00 AM to 01:00 AM and next 60 buckets will be for 01:00 AM to 02:00 AM, and so forth. If calculating a distribution for 90 days, there will be 90 sets of 144 buckets each having an access count for the minute of the day for 90 days.

In the above example if the user accesses the application between 01:01 AM to 01:20 AM, then buckets 61 to 80 will have the access count. Similarly, access from 02:40 AM to 02:59 AM will be stored in buckets 160 to 179. If a request arrives at 01:55 AM, the system will consider 1 hour of baseline from 01:25 AM to 02:24 AM (60 minutes window, 30 minutes before and 30 minutes after the access time), instead of clock boundary from 01:00 AM to 02:00 AM as in the previous case. In this case, the system will first merge 60 buckets from 85th bucket (01:25 AM) to 144th bucket (02:24 AM) for each of the 90 days bucket sets, then merge the 90 merged buckets to calculate the baseline for the hour between 01:25 AM to 02:24 AM. Since the user has never accessed the system during this hour of the day, the system will be able to detect the request as anomalous and be able to flag it. Similarly, if a new request arrives at the system at 02:10 AM, the baseline evaluation window of 1 hour will be shifted to 01:40 AM to 02:39 AM (from bucket 100th bucket to 159th bucket).

The rolling distribution could be created on demand by evaluating the window of 60 minutes and then merging the 90 days intermediate distributions into the hour of the day distribution value. Another approach is applied where the distribution is pre-calculated for every passing minute, by simply removing the previous minutes bucket count and adding the next minutes bucket count. For example, the baseline for 10:20 AM could be calculated by using the baseline calculated for 10:19 AM by removing the bucket counts for 09:50 AM and then adding the bucket count for 10:50 AM from the distribution value of 10:19 AM. This is how rolling baseline is calculated by sliding a window of buckets of size 60 (if the baseline is created for hourly distribution for daily seasonality).

Although rolling distribution calculations have higher accuracy than more coarse distributions, they have greater storage and processing costs.

The exact value assigned to a particular element bucket may vary in different embodiments, such as incrementing a bucket element by one for each application access data item that corresponds to that element bucket. In some embodiments, the value assigned to a particular element bucket based on a particular application access data item is influenced by the age of the data item, as determined by its time value. For example, older data items may be weighted less heavily than more recent data items, such as with a weighted moving average or an exponentially weighted moving average.

The access evaluation module 210 uses the various access distributions 201 generated by the learning module 305 to assess in real time whether a given application access request is anomalous. In some embodiments, the access evaluation module 210 obtains the application access data for the application access request, selects the appropriate access distribution (or distributions, for embodiments in which distributions at different timescales are employed) based on the user ID, application ID, and any additional contextual data, and compares the selected distributions with the application access data.

In some embodiments, the access evaluation module 210 separately evaluates the anomalousness of access distributions corresponding to different attributes of the application access data and determines the overall anomalousness based on the separate evaluations. For example, if a particular access request has application access data indicating that the source IP address of the request is X and that the application to which access is requested is Y, the access evaluation module 210 could determine the anomalousness of the request based on the access distribution computed for requests coming from IP address X, and separately determine the anomalousness of the request based on the access distribution computed for requests for application Y, and then compute the overall anomalousness as a function of the two separate determinations (e.g., as anomalousness overall if any of the individual determinations were considered anomalous).

In some embodiments, the access evaluation module 210 returns a real-valued score (e.g., a number in the range [0, 1]) to quantify the degree of anomalousness of the present request; in other embodiments, access evaluation module 210 instead returns a Boolean value to indicate whether or not the access is believed to be anomalous.

The enforcement module 215 takes an action in response to the access request based on the determination of the access evaluation module 210 about the access request. For example, in some embodiments if the access evaluation module 210 determines that the request is not anomalous (or that the degree of anomalousness is below a particular threshold), then the enforcement module 215 allows the application access to proceed, but if the access evaluation module 210 determines that the request is anomalous (or that the degree of anomalousness is above a particular threshold), then the enforcement module 215 takes a remedial action. The remedial action could be (for example) denying the request. Alternatively and/or additionally, the remedial action could be requiring additional security, such as the provision of an additional factor (e.g., the provision of a one-time code sent via text message or email), e.g., by consulting user data 101 to determine which factors the user is permitted to use, beyond any factors already obtained as part of the present application access request.

The application ranking module 220 (if present) ranks applications 110 to which the user has access according to the access distributions generated by the learning module 205 for that particular user and those applications. More specifically, the application ranking module 220 assembles attribute values for an application access data tuple, as if the user were making a request at that moment for access to the various applications (e.g., given the current context such as device information, location information, or the like). The score for the ranking may be directly correlated with the score that the access evaluation module 210 would produce, such as the complement of the degree of anomalousness (e.g., a ranking score of 90% if the degree of anomalous score were 10%). As one simplified example, if a particular user U has access to applications $A_1$, $A_2$, and $A_3$, at time t, with additional contextual data C, the application ranking module will determine the ranking score for $<t, U, A_1, C>$, $<t, U, A_2, C>$, and $<t, U, A_3, C>$, ranking each of the applications according to their determined scores.

Figure 3:
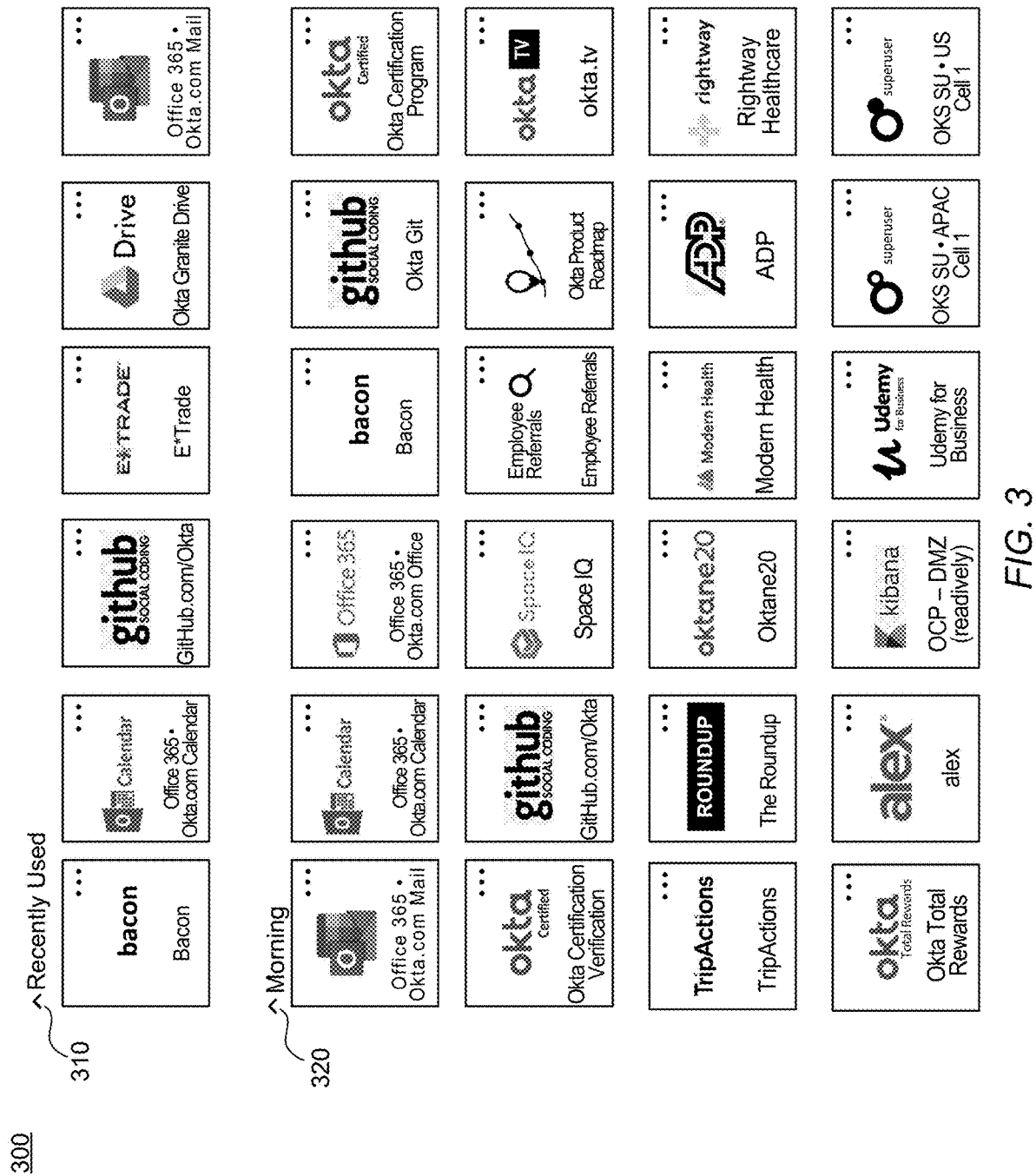
FIG. 3 illustrates a portion of a user interface displayed to a user by an SSO module of the identity provider system of FIG. 1B, according to some embodiments.

The application ranking may be used for various purposes. For example, the ranking may be used to position more highly-ranked applications more prominently within a user interface of the user. For instance, FIG. 3 illustrates a portion of a user interface 300 displayed to a user by the SSO module 107 of the identity provider system 100 of FIG. 1B. The user interface 300 includes a portion 310 displaying applications 110 in order of recency of access, and additionally includes a portion 320 displaying applications 110 ranked according to the access distributions for those applications and the current user, and according to the current time. For example, the top-left-most application in that portion 320 represents the application that would be most typical for the user to use in the current situation (i.e., at the present time, with the current context such as current location or IP address, etc.). Thus, the user is afforded quick access to the applications that he or she most typically uses at the current time. This dynamic and context-sensitive ordering improves the user experience, relative to a more fixed ordering (e.g., alphabetical ordering), or even a dynamic ordering not taking into account the entire context of the user request.

Figure 4:
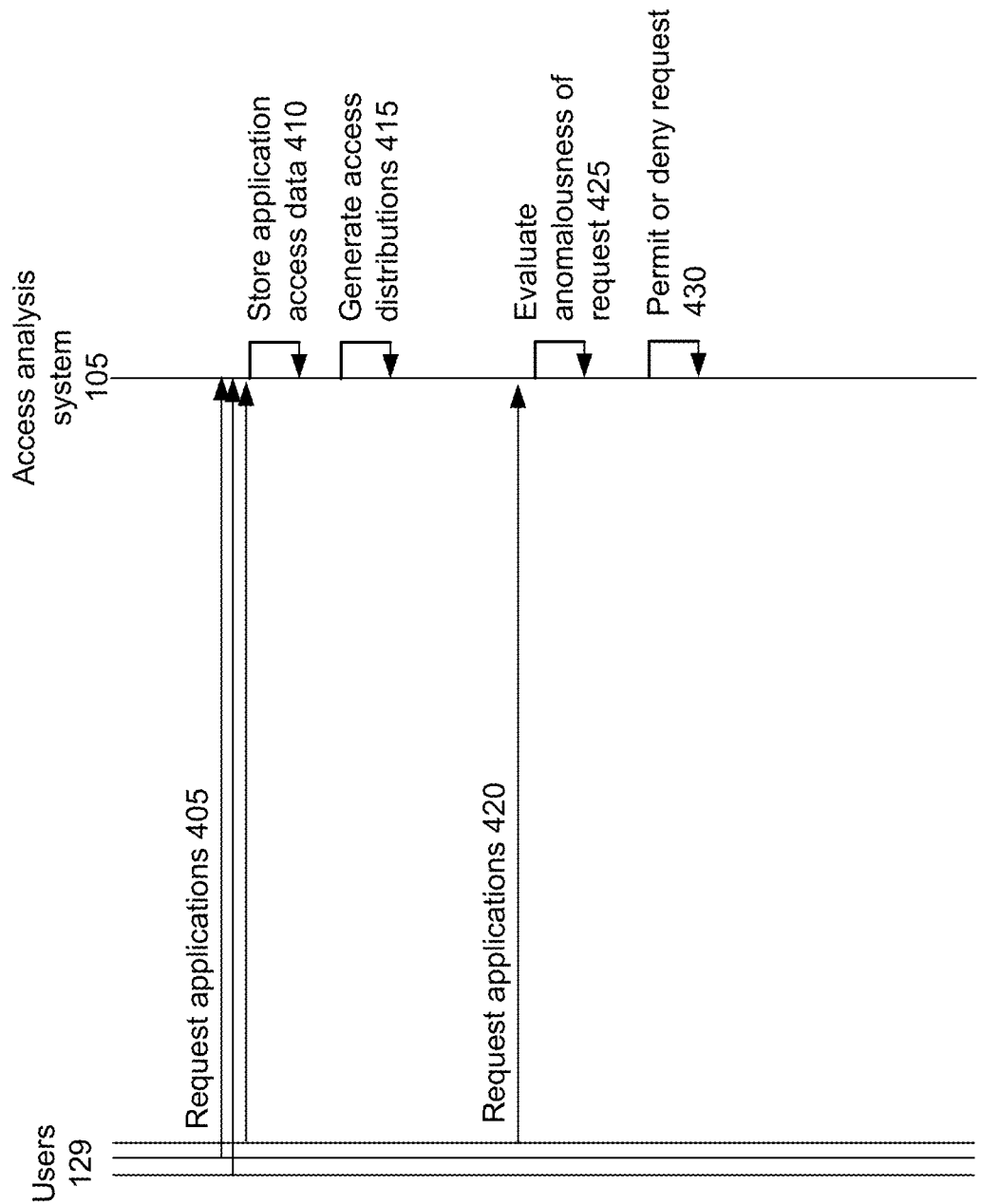
FIG. 4 illustrates the actions taken by the access analysis system of FIG. 1 when learning from prior application access requests and when using the learning to evaluate a new application access request, according to some embodiments.

FIG. 4 illustrates the actions taken by the access analysis system 105 when learning from prior application access requests and when using the learning to evaluate a new application access request, according to some embodiments.

The various users 129 user their client devices 121 and make requests to access applications 110. The requests may be implicitly generated based on user actions, rather than being explicit requests from the users. For example, the users may use the identity provider system 100 of FIG. 1B and its SSO module 107 to handle sign-on to the applications 110 that they are permitted to use via the identity provider system 100, and the access requests may be (for example) selections of application icons such as those in the user interface of FIG. 3.

As a result, the access analysis system 105 receives the application access request data corresponding to the requests, such as the current time, the user ID of the requesting user, and the like, as noted above with respect to the learning module 205, and stores 410 the application access request data, such as in random access memory for immediate processing, or for durable secondary storage for later batch processing, depending on the embodiment. At some point, the learning module 205 generates 415 the access distributions, as described above with respect to FIG. 2. The access distributions may be generated on a per-user basis, at separate times (e.g., when enough access data has been accumulated for a given user), and/or for many users at the same time, such as on a periodic basis. The access distributions may also be re-generated at later times based on additional subsequently-received access data. During the period before an access distribution has been generated for a given user, the enforcement module 215 may respond to requests by that user for application access with heightened scrutiny, such as by requiring the provision of additional authentication factors.

At some later point, one of the users 129 for whom the access analysis system 105 generated an access distribution requests 420 access to an application 110. The access analysis system accordingly evaluates 425 the request according to the generated access distribution(s) for the user, as described above with respect to the access evaluation module 210, determining whether or not (or to what degree) the request appears anomalous with respect to the previously-generated access distributions. Based on the determination, the access analysis system 105 responds to the request as described above with respect to the enforcement module 215, e.g., by permitting the request (e.g., by allowing the SSO module 107 of FIG. 1B to transparently sign the user onto the request application 110), by denying or challenging the request (e.g., by requesting additional authentication factors from the user), or the like.

Figure 5:
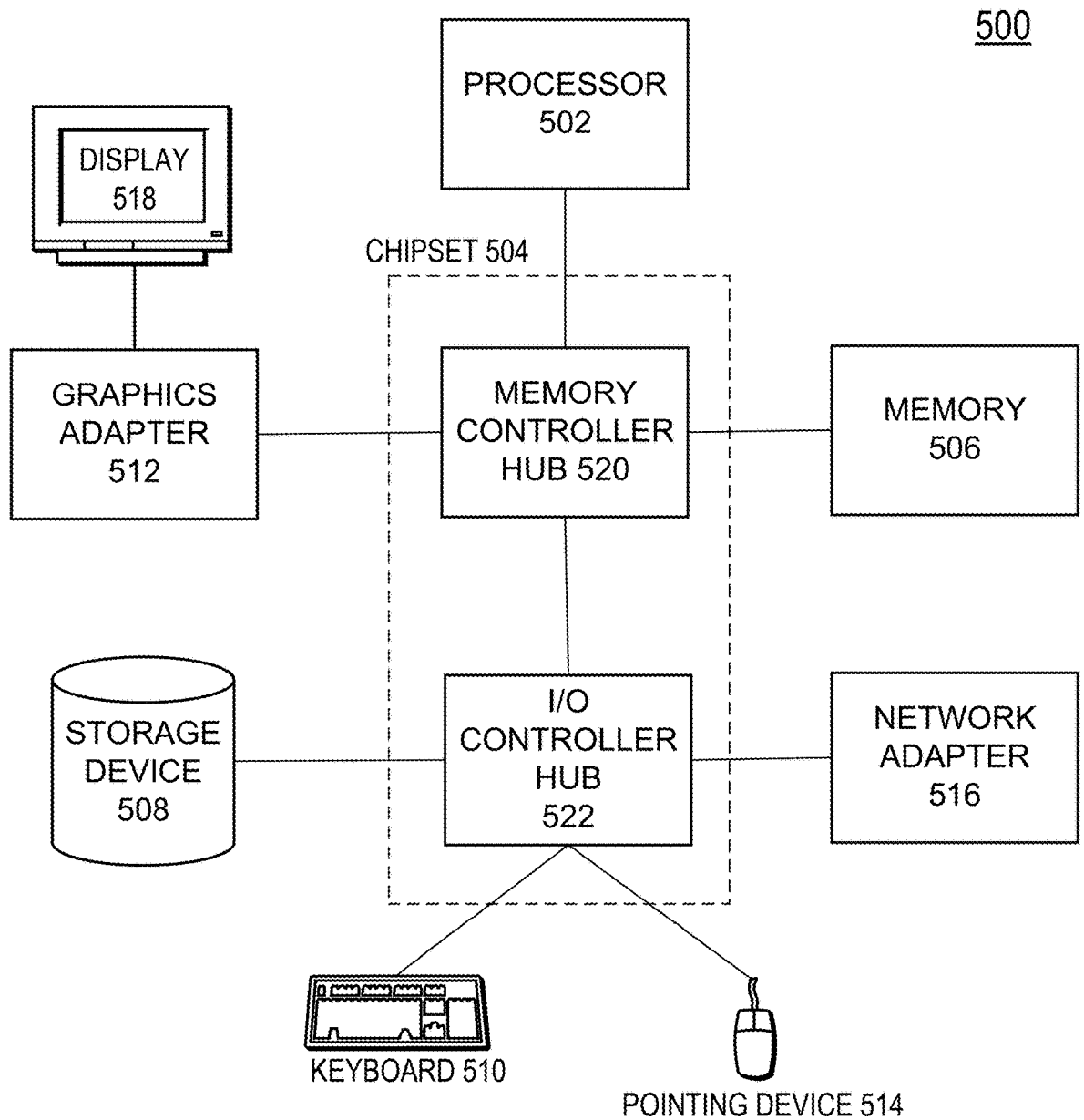
FIG. 5 is a high-level block diagram illustrating physical components of a computer used as part or all of (for example) the identity provider or the client device, according to one embodiment.

FIG. 5 is a high-level block diagram illustrating physical components of a computer 500 used as part or all of (for example) the identity provider 100, the client device 121, and/or the third-party application server 110, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard 510 or pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:
1. A computer-implemented method comprising:
obtaining application access data including attributes of requested accesses by users to remote applications, the attributes including times of the requested accesses;
for each of the users, generating an access distribution of the requested accesses by the user based on the attributes, the access distributions quantifying application accesses according to an associated timescale;
after the generation of the access distributions, receiving first access data including a plurality of attributes of a requested access by a first user to a first remote application, the plurality of attributes including a time of the requested access;

identifying an access distribution for the first user corresponding to the attributes of the first access data; and determining, using the identified access distribution and the time of the requested access, whether the requested access is anomalous.

2. The computer-implemented method of claim 1, further comprising:

generating, for each user of a plurality of the users, a plurality of access distributions, each access distribution corresponding to a different tuple of values of the attributes, wherein identifying an access distribution for the first user comprises identifying the access distribution based on the tuple of values of the attributes of the requested access.

3. The computer-implemented method of claim 1, further comprising:

generating, for each of the users, a plurality of access distributions corresponding to a same tuple of values of the attributes, each of the plurality of access distributions having a different associated timescale.

4. The computer-implemented method of claim 3, wherein the timescales include at least two of: a time of day, a time of week, or a time of month, wherein the time is measured in an increment from at least one minute to at most one hour.

5. The computer-implemented method of claim 1, further comprising:

requesting from the first user a first authentication factor responsive to the requested access to the first remote application; and responsive to determining that the requested access is anomalous for the first user:

identifying one or more additional authentication factors to which the first user has been granted access; and requesting from the first user some of the one or more additional authentication factors.

6. The computer-implemented method of claim 1, wherein a tuple of the plurality of attributes for the requested access comprises at least two of: geolocation, network address, browser type, or operating system type.

7. The computer-implemented method of claim 1, wherein a tuple of the plurality of attributes for the requested access comprises an identifier of a portion of the first remote application to which access is being requested.

8. The computer-implemented method of claim 1, further comprising:

ranking remote applications for the first user using the access distribution generated for the first user; and presenting the remote applications to the first user within a graphical user interface in an order corresponding to the ranking.

\* \* \* \* \*